US012100527B2

(12) United States Patent
Blanton et al.

(10) Patent No.: US 12,100,527 B2
(45) Date of Patent: Sep. 24, 2024

(54) CLOSURE LID DESIGN FOR CONTAINMENT VESSEL

(71) Applicant: UCHICAGO ARGONNE, LLC, Chicago, IL (US)

(72) Inventors: Paul S. Blanton, Aiken, SC (US); Zenghu Han, Woodridge, IL (US); Yung Y. Liu, Hinsdale, IL (US); Ronald B. Pope, Waynesboro, PA (US); James M. Shuler, Germantown, MD (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 17/675,604

(22) Filed: Feb. 18, 2022

(65) Prior Publication Data

US 2023/0268094 A1 Aug. 24, 2023

(51) Int. Cl.
*G21F 5/12* (2006.01)
*G21F 5/005* (2006.01)
*G21F 9/36* (2006.01)

(52) U.S. Cl.
CPC ................ *G21F 5/12* (2013.01); *G21F 5/005* (2013.01); *G21F 9/36* (2013.01)

(58) Field of Classification Search
CPC ... G21F 5/12; G21F 5/005; G21F 9/36; B65D 45/28
USPC ...................... 220/359.2, 244, 245, 248, 314
See application file for complete search history.

(56) References Cited

U.S. PATENT DOCUMENTS

| | | | | |
|---|---|---|---|---|
| 1,353,183 A * | 9/1920 | Ruedy | B65D 45/28 292/7 | |
| 2,171,876 A * | 9/1939 | Jenkins | C10B 25/04 220/244 | |
| 2,260,752 A * | 10/1941 | Marasso | A21C 1/1485 220/244 | |
| 4,519,519 A * | 5/1985 | Meuschke | G21F 7/005 220/291 | |
| 8,616,404 B1 | 12/2013 | Starck et al. | | |
| 9,056,701 B1 * | 6/2015 | Haibel | B65D 45/28 | |
| 9,875,819 B2 | 1/2018 | Singh et al. | | |
| 10,186,336 B2 | 1/2019 | Liu et al. | | |
| 2004/0011971 A1 | 1/2004 | Nicholson et al. | | |
| 2014/0039235 A1 | 2/2014 | Subiry | | |
| 2016/0012926 A1 | 1/2016 | Lehnert et al. | | |

FOREIGN PATENT DOCUMENTS

| | | | |
|---|---|---|---|
| CN | 114446504 A * | 5/2022 | |
| FR | 2976570 A1 * | 12/2012 | G21F 5/12 |
| GB | 2218663 A * | 11/1989 | G21F 5/12 |

* cited by examiner

*Primary Examiner* — J. Gregory Pickett
*Assistant Examiner* — Niki M Eloshway
(74) *Attorney, Agent, or Firm* — CHERSKOV FLAYNIK & GORDA, LLC

(57) ABSTRACT

The invention provides a containment structure, the containment structure comprising a vessel with an upwardly facing opening defining a periphery; a lid in rotatable and slidable communication with the periphery; and a plurality of rods contained within the lid and in slidable communication with the periphery. Also provided is a method for sealing and unsealing a containment vessel defining a body with a longitudinal axis and a lid, the method comprising simultaneously moving the lid parallel to the longitudinal axis and orthogonal to the longitudinal axis.

9 Claims, 9 Drawing Sheets

Closed

Open

CLOSURE LID DESIGN FOR CONTAINMENT VESSEL

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to containing radioactive waste and more particularly this invention relates to a closure means and method for isolating waste in a radioactive material packaging.

2. Background of the Invention

Improper disposal of disused radiological sealed sources used by the oil and gas industry, manufacturing, medicine, research, academic institutions, and even government entities continues to have severe environmental and therefore health ramifications. Sealed sources will eventually reach a point where they are no longer usable for their intended purpose, after which they need to be removed, temporarily stored, transported, and ultimately disposed of in a licensed radioactive waste site.

In general, the higher the level of radioactivity in the sealed source, the stricter the regulatory control that should be applied to its use, control, and ultimate disposition. However, lack of control and oversight can and do lead to sources ending up in the wrong place, for example, as orphan sources in uncontrolled storage, disposed in a sanitary landfill, melted down in metal recycling operations and/or incorporated into consumer products.

Furthermore, these sources may be handled by an unsuspecting member of the public. There have been many publicized events during which sealed sources were lost or stolen that resulted in serious injuries and death to unsuspecting members of the public, and massive economic loss, particularly over concerns of potential malicious use by terrorists as radioactive dispersion devices.

Many factors contribute to this problem, but in many cases, lack of availability of certified Type B transportation packaging is a barrier to the safe and secure management of disused radiological sealed sources. A Type B package design must not only demonstrate its ability to withstand tests simulating normal shipping conditions, but must also withstand a sequential set of severe accident conditions without releasing its contents, considering an environmental temperature range of minus 20° F. to plus 100° F. These severe accident conditions include the following:

- A 30 foot drop onto a flat, unyielding surface so that the package's weakest point is struck.
- A crush of the package by an 1100 pound 40 inch square steel plate dropped horizontally from 30 feet so that the package's weakest point is struck.
- A 40 inch free drop onto a 6 inch diameter steel rod at least 8 inches long, striking the package at its most vulnerable spot.
- Exposure of the entire package to 1475 degrees F. for 30 minutes.

- Immersion of the package under approximately 620 feet of water for at least 1 hour.

A need exists in the art for a system and method for safely sequestering radioactive waste in Type B transportation packages. The system and method should enable loading and unloading of waste into a hinged-lid containment vessel (HLCV) in confined spaces and either dry or wet. The system and method should also permit self-alignment and uniform sealing between the HLCV lid and the containment vessel (CV) body.

SUMMARY OF INVENTION

An object of the invention is to provide a system and method for isolating material in HLCVs that overcomes many of the drawbacks of the prior art.

Another object of the invention is to provide a system and method for hermetically sealing radioactive waste in HCLVs of a Type B transportation package. A feature of the invention comprises a CV lid having a double hinge. An advantage of the invention is that the double hinge permits self-alignment and uniform sealing between the lid and the CV body.

Briefly, the invention provides a containment structure, the containment structure comprising a vessel with an upwardly facing opening defining a periphery; a lid in rotatable and slidable communication with the periphery; and a plurality of rods contained within the lid and in slidable communication with the periphery.

Also provided is a method for sealing and unsealing a HLCV defining a body with a longitudinal axis and a lid, the method comprising simultaneously moving the lid parallel to the longitudinal axis and orthogonal to the longitudinal axis.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Both Government and industry, domestic and international, have potential uses of this invention. The inventors at Argonne National Laboratory have developed a new compact Type B transportation packaging, designated as Model 9602, for storage, transport, and disposal of disused radiological sources. The new Type B package's stainless steel structural components are designed to provide long-term performance against corrosion during dry storage (more than 50 years); thus, it may be possible to transport the package directly to a disposal facility without repackaging.

The invented Model 9602 compact Type B package design with HLCV is the only one providing a holistic solution for end-of-life management of disused radiological sources that can be used for transportation, long term storage (>50 years), and final disposal. Significant advantages of the Model 9602 package design with HLCV are compact in dimensions, lightweight, easy to handle and simple loading/unloading of contents, low cost, and amenable to high-volume production.

Figure 1:
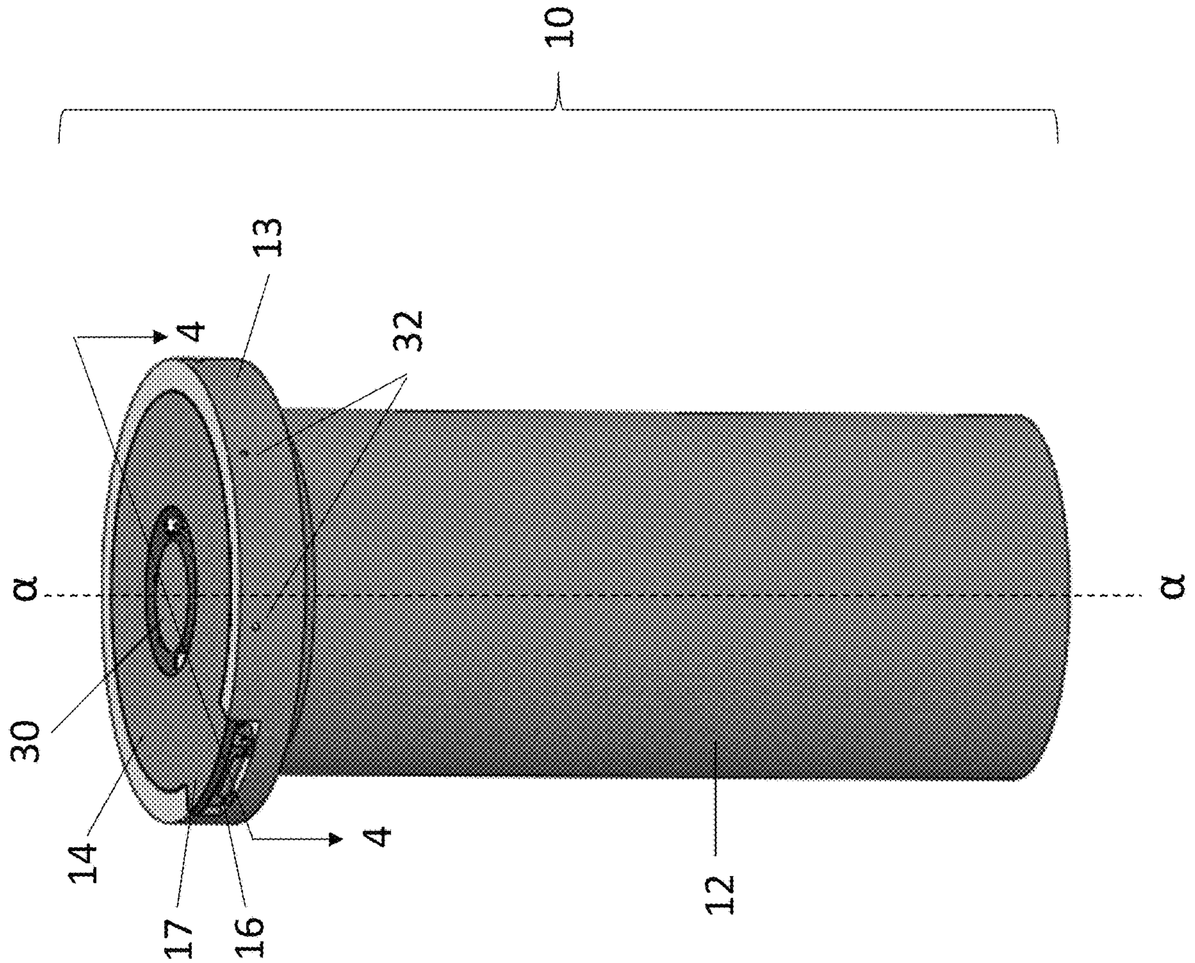
FIG. 1 is an elevational view of the containment system, in accordance with features of the present invention.

This invention comprises a CV closure design for containment vessels of a Type B transportation package of radioactive material (RAM). While the illustrations show a vessel with a circular cross section, other shapes (square, polygonal, spheroid, etc., may be accommodated. The invented system is depicted as numeral 10 in FIG. 1. The system comprises a containment vessel (CV) body 12 adapted to receive a lid 14.

The lid 14 rotatably and simultaneously slidably communicates with a periphery defined by the opening of the CV body 12 via a double hinge system 16. The lid has a circular periphery to complementarily nest within a periphery defining the opening of the CV body 12. The periphery is circumscribed by a flanged collar 13 which is a radially directed portion of the CV body. As such the flanged collar 13 defines a cantilevered ridge which projects over the remaining longitudinally extending exterior surface of the cylinder. Regions of the lid define a radially projected portion 17, the underside of which attaches to and is flush with a surface defined by structures of the double hinge 16. The hinge 16 itself is fastened to a notched portion of the aforementioned flange so as to enable the hinge to be countersunk relative to an upwardly facing surface of the flanged collar 13.

The closure lid 14 is connected to the CV body 12 through the double hinge 16, with locking mechanisms provided by a lid-cap and latch-rod subassemblies. The subassemblies comprise guide pins and springs for closing and opening of the hinged-lid CV (HLCV) by application of an external load.

Loading and unloading of radioactive material or other type contents into the HLCV can be accomplished in confined spaces either dry, as, for example, in a mobile hot cell, or wet, as in a pool.

A version of the HLCV may be used in conjunction with other elements of the Model 9602 compact Type B package design for end-of-life management of disused radiological sealed sources. It may also be used in transportation of reactor- and accelerator-generated radioisotopes.

Hinge Detail

The double hinge 16 permits automatic self-alignment and uniform sealing between the HLCV lid and the CV body 12. As such, this self-alignment can be done remotely, i.e., via robotics such that constant human intervention is not required to assure accurate lid placement. The lid simultaneously aligns and contacts an opening defined by the HLCV without manually imposing a continuous force on the lid.

FIG. 2 shows detail of the double hinge 16 incorporated in the invented lid. The double hinge design permits perpendicular closure of the lid onto the CV body 12. This double hinge design eliminates the sliding of the lid across the opening of the CV seen in typical hinge configurations. Rather, the double hinge allows for perpendicular engagement of the aforementioned radial projecting region of the lid with the opening of the CV.

The double hinge 16 comprises a first substrate 18 rotatably attached to a second substrate 20. The first substrate 18 defines an upwardly facing flat surface 22 which is attached to and flush with an underside surface of the radially projecting region 17 of the lid 14.

Figures 2A, 2B:
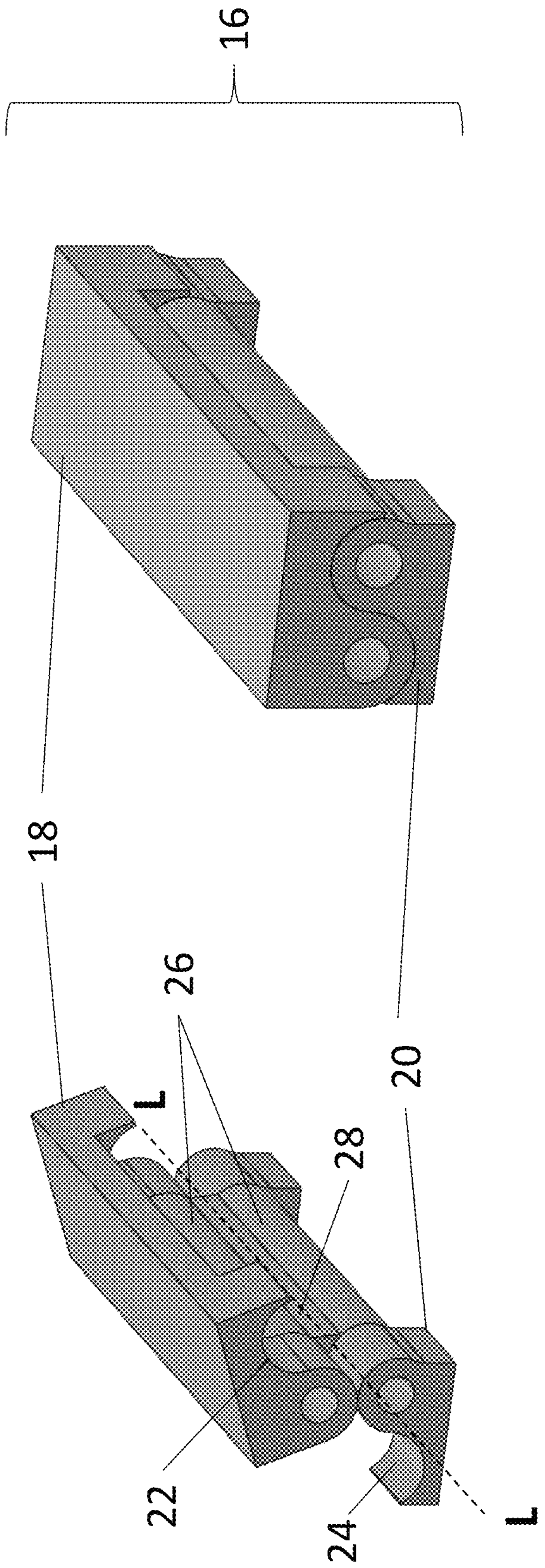
FIG. 2A shows detail of a double hinge in an open configuration, in accordance with features of the present invention.
FIG. 2B shows detail of a double hinge in a closed configuration, in accordance with features of the present invention.

FIG. 2A shows the hinge 16 in an open configuration, whereas FIG. 2B shows the hinge in a closed configuration. As can be determined between these two views, the hinge embodies two features. A first feature comprises the first substrate 18 rotatably communicating with the second substrate 20 along a single line L-L. Line L-L is parallel with the longitudinal axes of both the first and second substrate and is similar to a typical hinge.

A second feature comprises the first substrate 18 slidably communicating with the second substrate 20 in a direction generally perpendicular to the longitudinal axes of the two substrates. This sliding action is facilitated by a first region of the first substrate 18 opposing and contacting a second region of the second substrate 20. Both the first and second regions form surfaces resembling a sine wave such that both regions have a concave portion 22 integrally molded with a convex portion 24.

The first region of the first substrate 18 and the second region of the second substrate each comprise two convex portions 24 which flank a rod 26 disposed between each pair of convex portions such that the rod is in rotatable communication with its flanking convex portions. As such, each rod is positioned between two convex portions. (In typical hinge hardware parlance, the convex portions may be thought of as the knuckles and each of the rods considered the pin.) The rods are rigidly attached to each other via a bridging substrate 28 connecting longitudinally extending and opposing surfaces of the two rods.

When the hinge is in an open configuration (FIG. 2A), the convex portions of both regions are opposing each other. The convex portions of each region are situated inwardly from the concave portions when the convex portions are proximal to the periphery of the opening of the CV body. Conversely, the concave portions are radially disposed from the convex portions relative to the CV body.

As the hinge proceeds from an open position (FIG. 2A) to a closed position (FIG. 2B), the first substrate 18 (which is attached to the lid) will slide down the slope of the sine wave of the second substrate 20. In the fully closed position, the convex portion 24 of the first substrate 18 will fully nest within the concave portion 22 of the second substrate 20. Simultaneous with the aforementioned sliding, the first substrate will rotate about the rods (i.e., pins) of the two hinge configurations. This double action confers both rotatable and perpendicular movement to the first substrate 18 and therefore to the lid rigidly attached to the first substrate. As such, the hinge engages with the opening of the cylinder both rotatably and slidably, these actions occurring simultaneously during opening and closing of the lid.

Lid Mechanics

Detail

A center region of the lid defines a reversibly depressable region 30 (FIG. 3) which is in slidable communication with a remainder of the lid (said remainder including radially disposed regions from and circumscribing the center and also including a void space 33 (FIG. 5) in which the depressible region 30 nests.) The depressible region travels from a coplanar position with the remainder of the lid to a depressed position relative to the remainder of the lid, then back again. The region 30 may be depressed or otherwise actuated manually or with the aid of a specially developed a tool.

Figure 3:
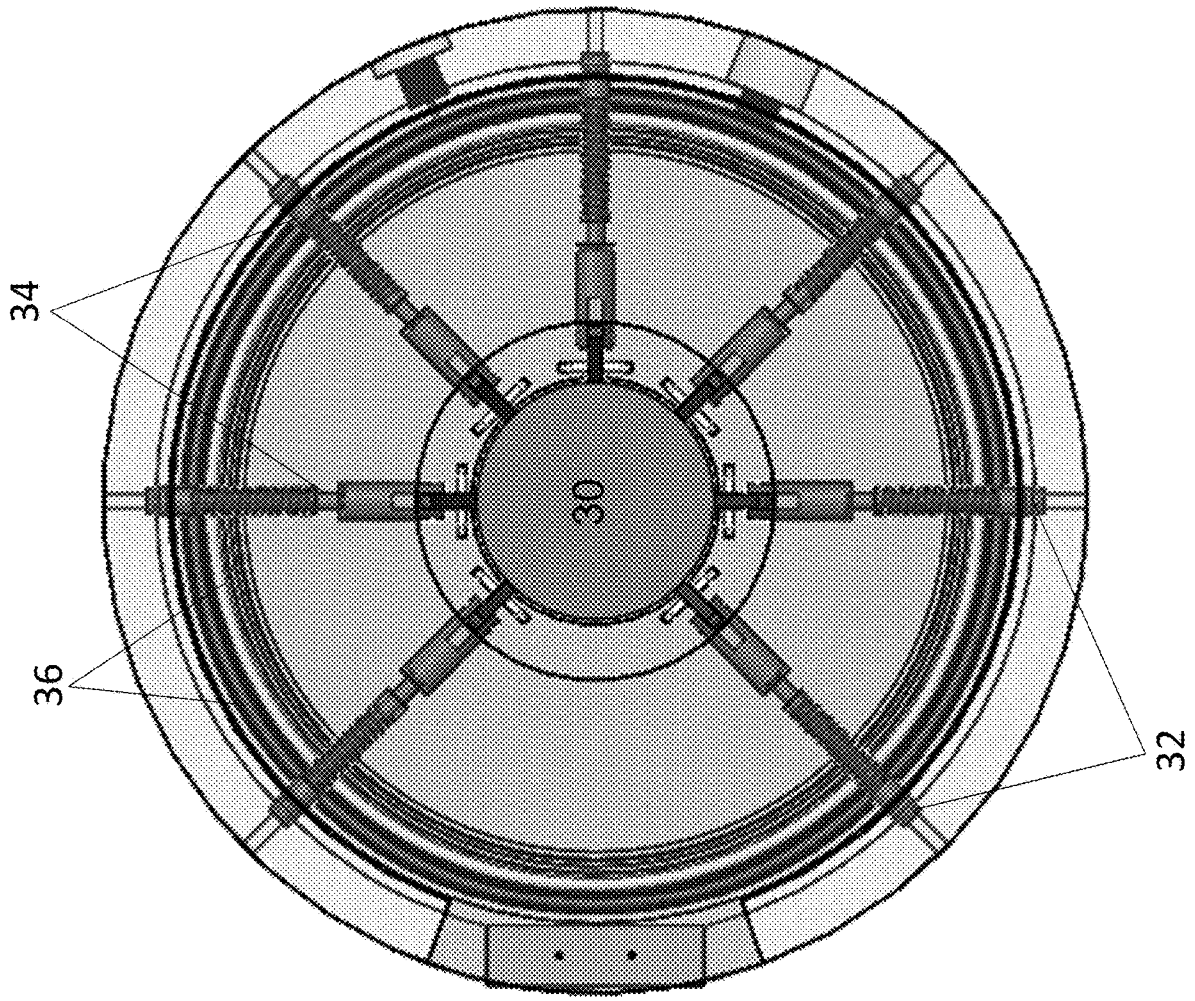
FIG. 3 is a plan view and partial cutaway view of the invented lid, in accordance with features of the present invention.

FIG. 3 is a plan view, cutaway view of the invented lid 14 showing the radial extension of the latch rods 34. As shown, an embodiment of the invention comprises a plurality of the latch rods 34 in slidable communication with the same number of radially extending channels 35 (FIG. 5) formed in the lid. Thus, the latch rods are radially disposed about the reversibly depressible region 30, akin to the spokes of a wheel. Each of the terminating regions 36 (FIG. 3) of the rods define an enlarged diameter, compared to the diameter of the remaining portion of the rod. As such, a first proximal end 38 (FIG. 5) of the terminating region forms a shoulder 39 (FIG. 7) adapted to contact and confine a spring 40 which is coaxial with the smaller diameter portions of the rod 34 (FIG. 4).

Figure 4:
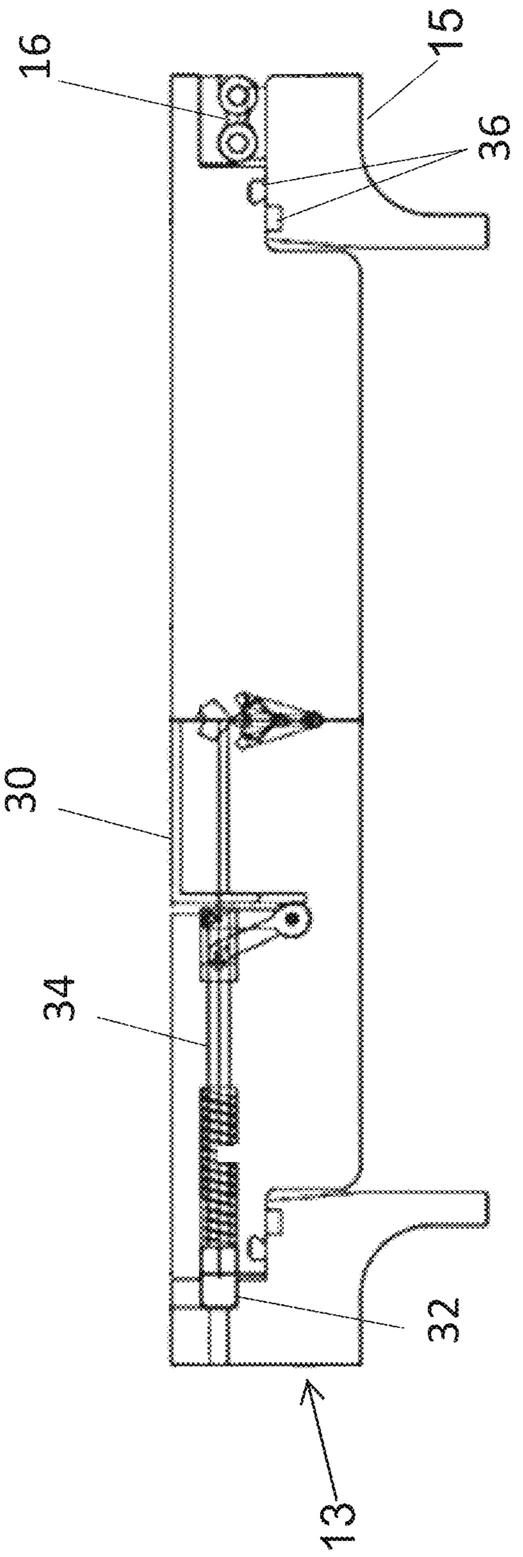
FIG. 4 is a view of the lid taken along line 4-4 of FIG. 1.
Figure 5:
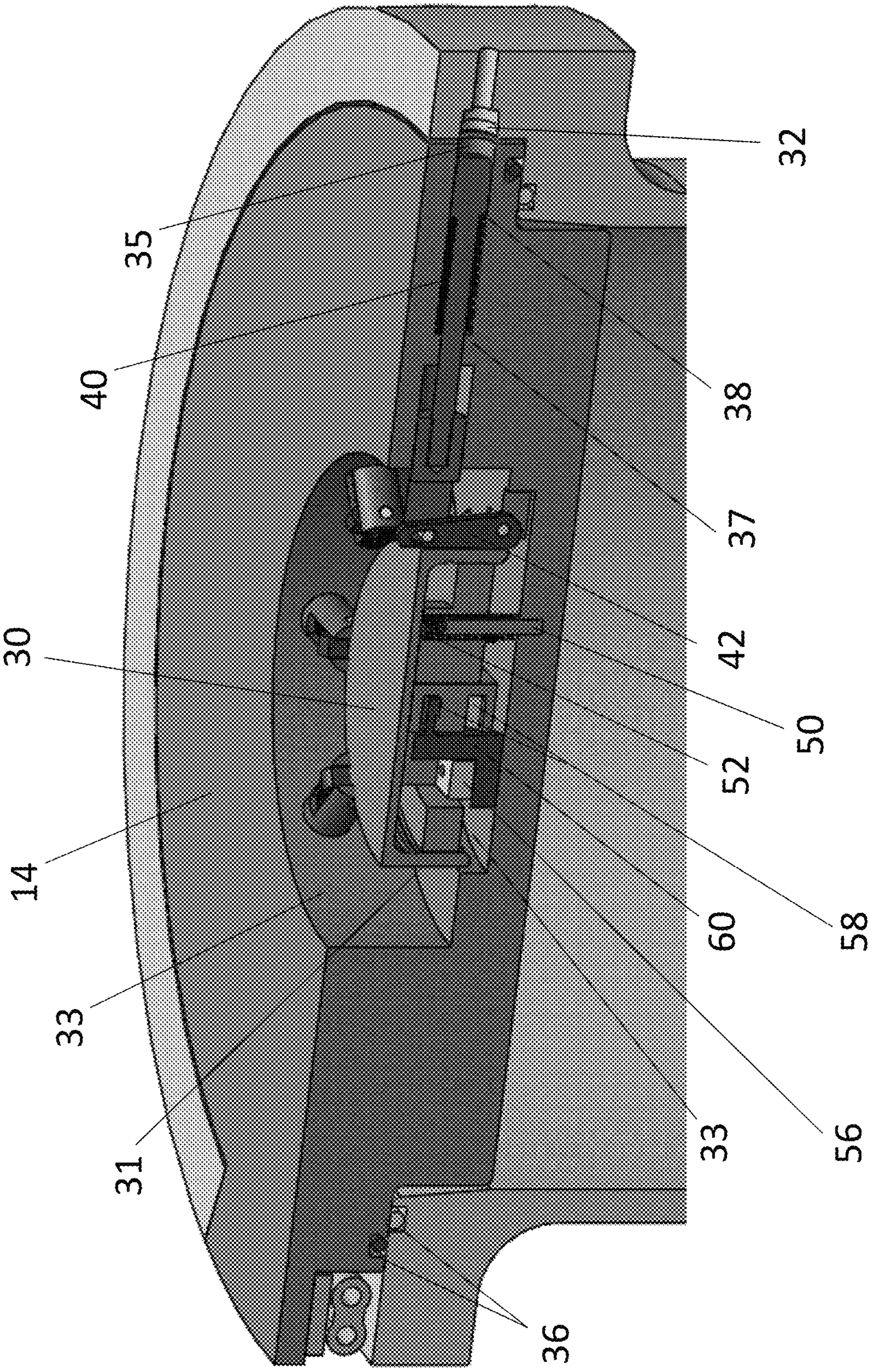
FIG. 5 is a perspective cutaway view of the invented lid in unlocked configuration with a HLCV, in accordance with features of the present invention.

As shown in FIG. 5, a medially directed end of the spring contacts a shoulder 37 formed by the channel 35, so that the spring is axially confined by the channel shoulder 37 and the latch pin shoulder 39 defining the distal end of the rod 34 (FIG. 4). Conversely, the spring 40 defines a central aperture or tunnel that has a diameter less than the diameter of the terminating region. A second, distal end 42 of the terminating region opposes the aperture 32 formed in the periphery of the CV body 12. The rods are shown in FIG. 3 in a non-extended configuration. The distal tips of the rods may or may not extend past the surface of the CV body flange. However, in instances where the rods do protrude pass the surface of the body flange, the rod tips may aid in stabilizing the containers relative to adjacent, proximal structures. Alternatively the rod tips may further engage with apertures of bulk housings for further stabilization.

In situations where the sealed HLCV are placed on their sides, all of the rods may be positioned flush with or otherwise countersunk with the external surface of the flange to facilitate rolling of the HLCV. Then, some of the rods may be extended to prevent rolling of the HLCV, while the distal tips of the other rods remain flush or countersunk with the exterior surface of the CV flange, this to facilitate close proximity to containers laid on top or to prevent snagging of the HLCV by rigging or other securement vehicles. Extension of some rods but not other rods beyond the periphery of the CV flange may be achieved by initially installing longer rods along peripheral portion of the lid during lid fabrication. Other rod extension means may include an extension adapted to be received by distal ends of some of the rods.

FIG. 4 is a cross sectional schematic of the CV lid 14 positioned in the locked position with the CV body. The aforementioned cantilevered region 15 of the flange 13 of the body can be discerned in this figure. The double hinge 16 is shown at the right side of the figure. A latch rod 34 is shown on the left and nested within the aperture 32 formed in an upper half of the flange 13 of the CV body. Prior to rod engagement, the lid is positioned so that it is coplanar with the circle formed by the opening of the CV body. In this pre-rod engagement configuration, the rod and aperture are nevertheless coaxial with each other.

Rod Actuation

Detail

Figure 6:
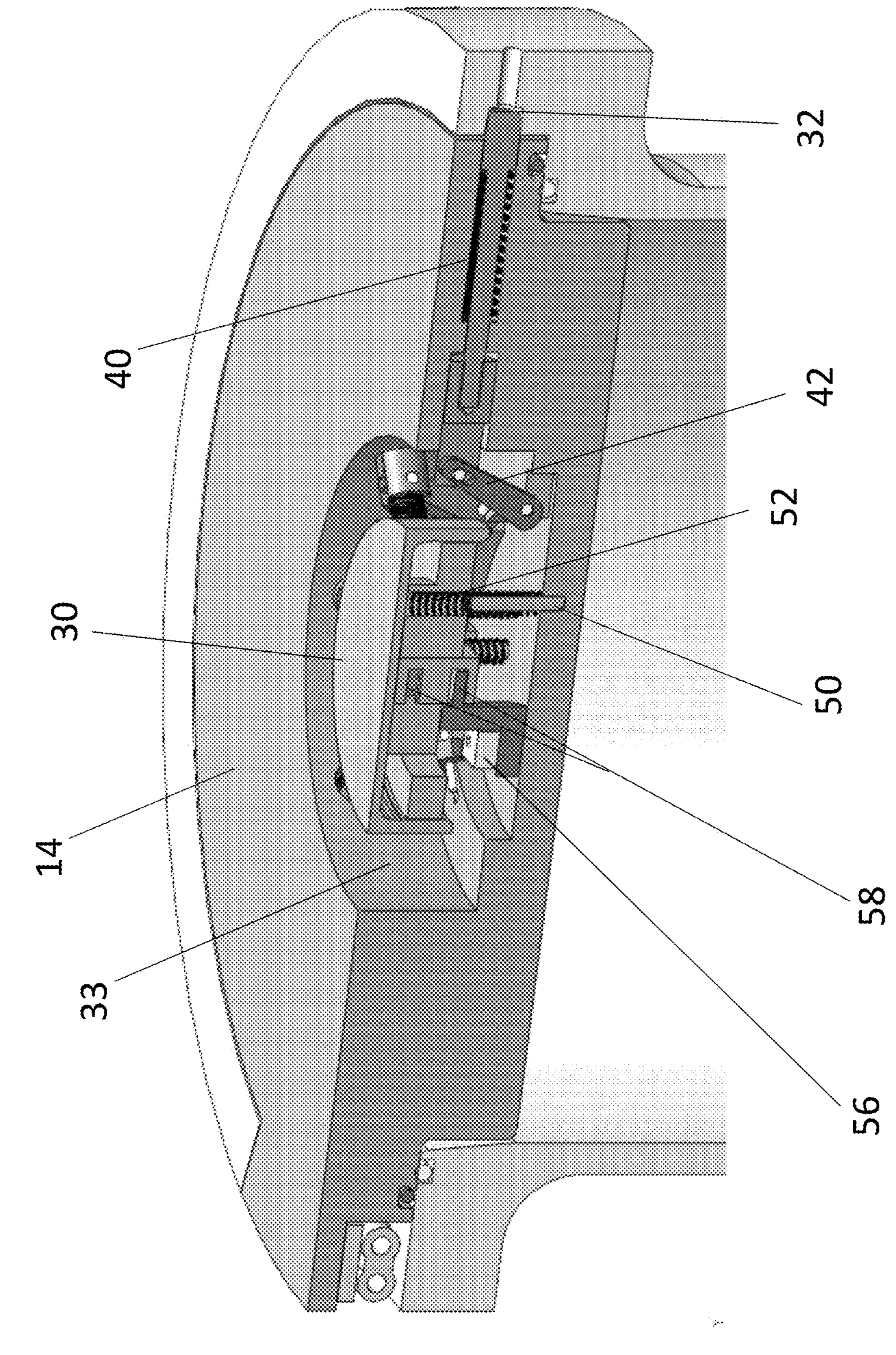
FIG. 6 is a perspective cutaway view of the invented lid in locked configuration with a HLCV, in accordance with features of the present invention.

FIGS. 5 and 6 depict the lid with the rods not engaged and engaged respectively with the periphery of the HLCV. FIG. 5 shows the center region 30 of the lid in a depressed (i.e., countersunk) position relative to the surround portion of the lid 14. A periphery of the center region 30 comprises an axially projecting skirt 31 extending away from the upwardly facing surface of the region 30. The downwardly directed skirt terminates in a depending end 33 facing toward the downward facing surface of the lid and therefore toward the HLCV below it. Each of several cranks 42 are radially disposed from a laterally facing surface of the skirt 31 and frictionally held thereby in an axially extending configuration relative to the longitudinal axis a of the HLCV, that axis depicted in FIG. 1. A proximal end 43 of the crank 42 is in hinge-able communication with the latch rod 34. A distal end 48 of the crank 42 contacts the radially facing surface of the cap skirt 31.

When the center region 30 is withdrawn from its countersunk configuration (FIG. 5) to a position coplanar with the remainder of the lid (FIG. 6), its integrally molded skirt 31 follows the withdrawal. This allows the distal end of the crank to rotate in a medial direction toward the axis of the CV body and therefore away from the periphery of the CV body. This movement is enabled by the latch rod spring 40 decompressing and otherwise expanding between the fixed shoulder 37 formed in the latch spring channel 35 and the relatively unfixed shoulder 39 formed in the distal region of the rod 34 (which is to say that the shoulder 39 formed in the distal region of the rod is movable relative to the shoulder formed in the latch spring channel). The consequence of this cascade of movement is that the latch rod is projected radially to nest within the aperture 32 in the side of the CV body as shown in FIG. 6.

Figure 7:
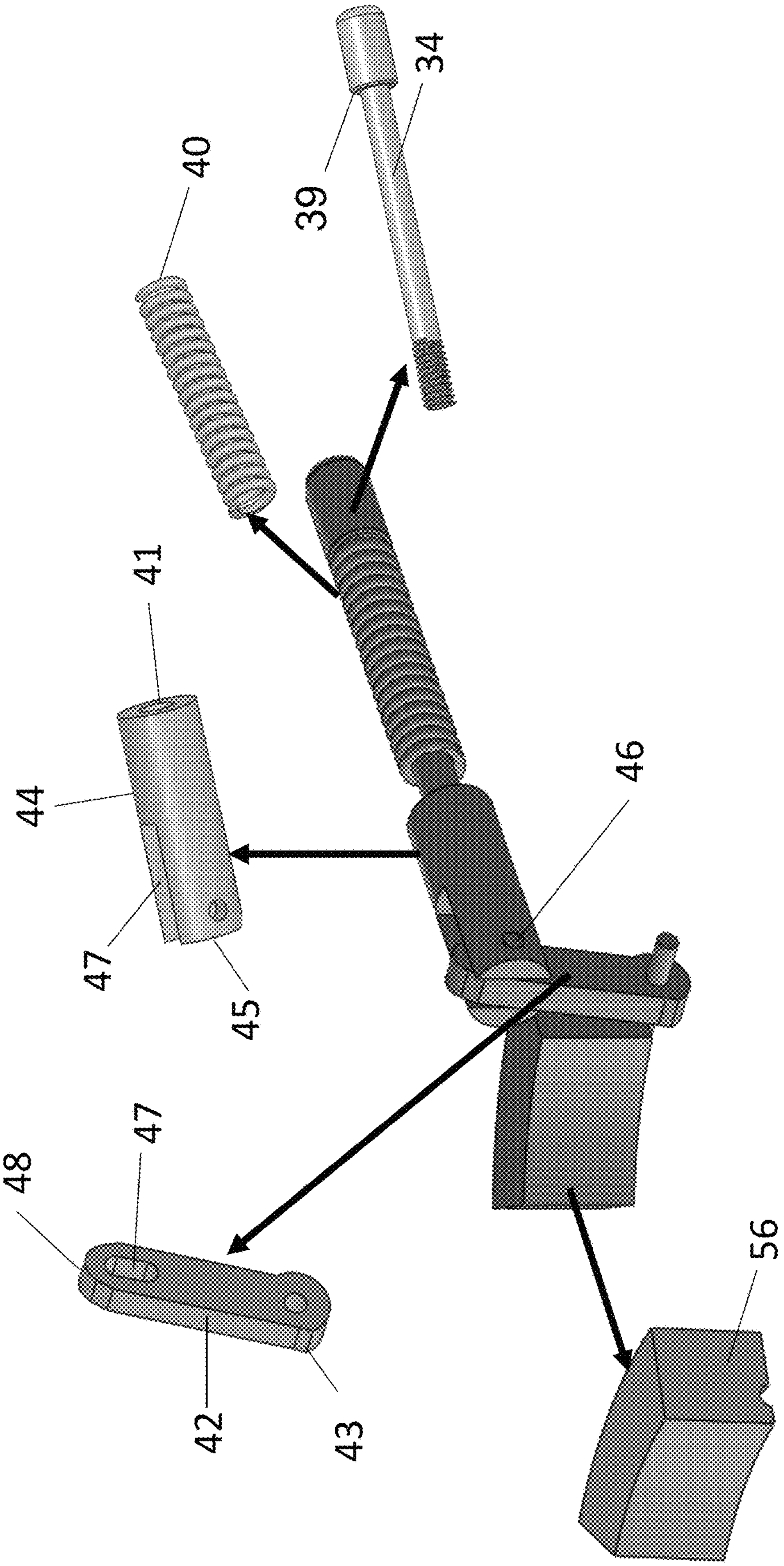
FIG. 7 is a detailed view of a latch rod sub assembly, in accordance with features of the present invention.

FIG. 7 provides further detail of the latch rod actuating mechanism. The aforementioned crank 42 hingeably communicates with the latch rod 34 via a rod link 44, whereby the rod link defines a first proximal end 45 rotatably communicating with the proximal end 47 of the crank 42 and a second end 41 adapted to threadably receive the latch rod 34. The rotatable communication between the rod link 44 and crank 42 is enabled by a pin 46 adapted to be received by an aperture formed at the proximal end 45 of the rod link and in registration with an axially extending channel 47 formed at the proximal end 48 of the crank.

Lid Anchoring and
Securement Detail

Figure 8:
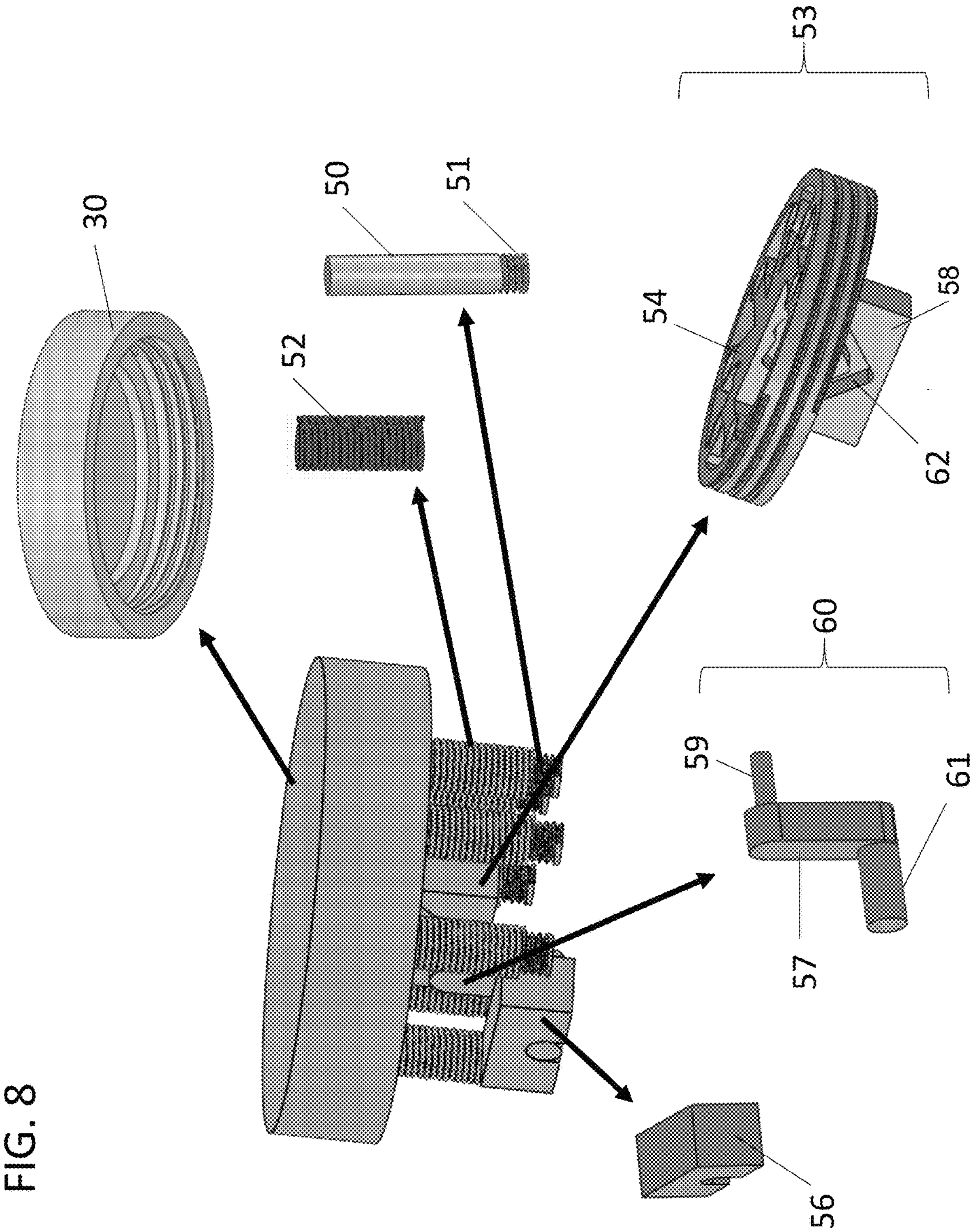
FIG. 8 is a detailed view of a lid cap sub-assembly, in accordance with features of the present invention.

FIG. 8 shows detail related to the underside of the center portion 30 of the lid. A plurality of axially directed track guide pins 50 are adapted to coaxially receive a plurality of guide pin springs. This combination provides axially and outwardly directed force on the lid center portion 30 when the lid center portion is in a latch rod nested configuration, that configuration shown in FIG. 6.

The track pins 50 and guide pin springs 52 are anchored to the underside of the center cap 30 via a track assembly 53. Generally circular in its periphery, the track 53 assembly has two regions: a superior disk-shaped portion referred to herein as a guide disk 54, and a depending tongue portion 58 defining a closed track 62, coaxial to the center of the disk, defining a track adapted to slidably communicate with a superior distal end 59 of a follower 60 described infra.

The guide disk 54 has a cross section that is complementary to the cross section of an inside periphery of the center portion 30 so as to be threadably received by a periphery of an interior void defined by the underside of the center portion 30. The guide disk 54 serves as a track in that it defines regions forming transverse apertures through which the pins 50 and springs 52 extend.

Distal ends 51 of the pins 50 define threads so as to be threadably received by threaded apertures formed in a basement surface of the void space 33 (FIG. 5).

The configuration depicted in FIG. 8 provides a means for urging the latch rods 34 to a retracted, unnested configuration whence the CV lid has to be unsealed from the CV body after an initial sealing.

A follower 60 and a follower clamping block 56 are utilized to restrain the lid center portion 30 so that the center portion remains in contact with the lid. The follower 60 resembles a crank such that it defines a central region 57 terminating in two opposite extending protuberances such that the protuberances extend at an angle that is generally orthogonal to a longitudinal axis of the central region 57. The follower is arranged so that its longitudinal axis is parallel to the longitudinal axis of the HLCV 12; in this configuration, a first superior protuberance 59 is maintained above a lower inferior protuberance 61. The lower inferior protuberance is anchored to the basement surface 37 of the void space 33 by the follower clamping block 56. Thus, the first superior protuberance is the distal end of the follower and not permanently attached to a similar structure.

Figure 9A:
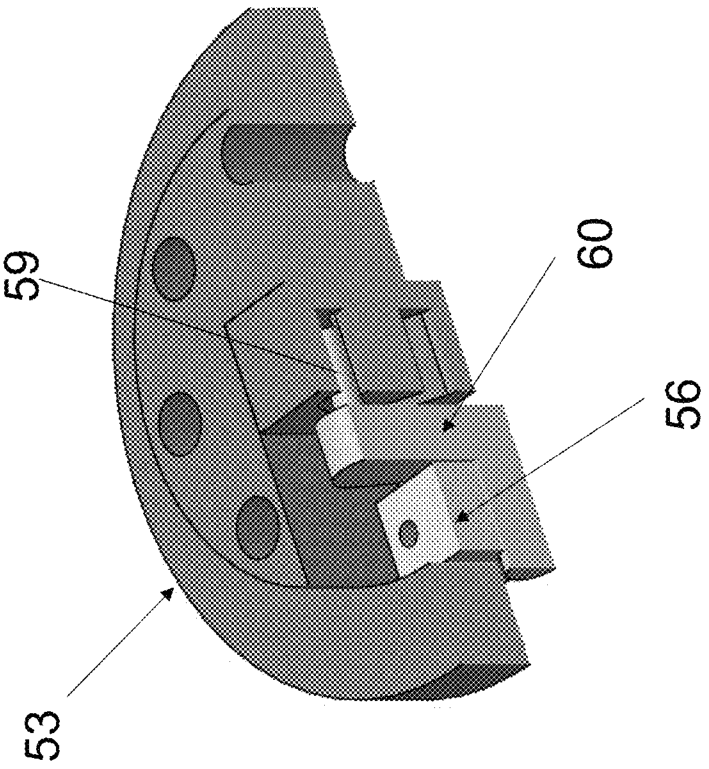
FIG. 9A is a detailed view of a track engaged with a clamping block, in accordance with features of the present invention.
Figure 9B:
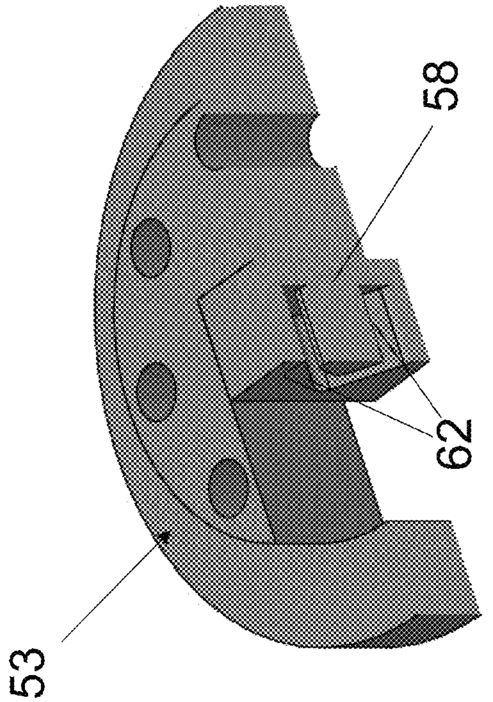
FIG. 9B is an isometric view of a track assembly, in accordance with features of the present invention.

As discussed above, the first superior protuberance 59 reversibly nests within the track 62 formed in a laterally facing surface of the depending tongue. FIG. 9A shows the track 62 engaged with the follower. FIG. 9B shows the track assembly 53 without the follower. The track, 62, has a cross section relatively larger than a cross section of the first superior protuberance 59 so as to allow for frictionless engagement and disengagement with the protuberance. Further, the track is generally shaped as a "C" to provide a cam surface whereby the protuberance 59 may be urged from a first position to a second relatively low position, depending upon its position within the track.

When the lid center portion 30 is in the countersunk configuration (FIG. 5) relative with the rest of the lid 16, the first superior protuberance 59 resides in the upper region of the track. When the lid center portion 30 is in the coplanar configuration (FIG. 6) relative to the rest of the lid, the first superior protuberance 59 resides in the lower region of the track 62. The track 62 inner profile is laterally offset from the outer track profile causing the first superior protuberance 59 to track clockwise as the track assembly is toggled.

Compressive Force
Detail

FIGS. 3 and 4 depict annular grooves 36 formed in an underside of the lid and an upwardly facing surface of the periphery of the CV body. These annular regions are adapted to receive seals. As such, the grooves 36 circumferentially extend around the underside and upwardly facing surfaces of the lid and periphery of the CV body, respectively. The grooves 36 are shown offset from each other so as to not directly oppose each other. The annular groove 36 formed in the underside of the lid is laterally disposed from the annular groove 36 formed in the upwardly facing surface of the periphery of the CV body. In this configuration, the inner groove is located in the top surface of the CV body periphery while the outer groove is located in the downwardly facing surface of the hinged lid.

The outer groove incorporates a non-metallic gasket (e.g. an elastomeric seal such as EPDM) while the inner groove incorporates a metallic seal. The inner metallic seal provides the containment boundary, has a long life and withstands a wide range of environments. The outer elastomeric seal is used during packaging assembly for leak testing of the containment boundary.

A force of between 20 thousand and 60 thousand pounds may be required to hermetically seat the metal and elastomeric seals during sealing of the lid to the CV body. Conversely, that amount of force would also be necessary to remove the lid from the CV body. The force may be applied, either hydraulically or pneumatically, to lid 14. The hydraulic or pneumatic force may be applied directly to lid 14 such that any closure tool physically contacts and forces the lid downwardly. Alternatively, the hydraulic or pneumatic force may be applied to the exterior bottom surface of the CV body while maintaining the closed but not yet sealed CV body in a vise or other restraining means. The aforementioned forces would not be required to activate/deactivate the sealing of the lid to the body such that manually applied force to the center region 30 of the lid from an average person (so between 40 and 100 pounds of force) will actuate the latch rods described above. The rods are provided to maintain the sealing force imposed by the aforementioned metal and elastomeric seals.

In operation, the invented system is placed upon a support surface with its lid 14 in an open position. Material is loaded into the CV body, after which the lid is closed and automatically aligned with the CV body, said closure usually done remotely given the harmful nature of the material. Such remote closure includes a gloved hand (or hands) in conjunction with a glove box or containment room, levers, robotic arms, or a combination of thereof to provide an inertial push on the lid to continue closing.

Visual inspection of the lid is typically made to confirm accurate alignment with the CV body. After such confirmation, a first axial force is applied to the lid, the axial force extending along the longitudinal axis of the CV body. A suitable first force necessary to actuate the metallic seals is applied to assure sealing of the lid to the CV body. The first axial force may be applied to regions of the lid diametrically opposed to the hinge positioned between the lid and the CV body. Alternatively, the first axial force may be applied along the entire periphery of the upwardly facing surface of the lid. The first axial force would not be applied at this juncture to the center of the lid, as depression of the center is associated with the rod actuation action described supra. Such axial force may be directed downwardly so as to be directed toward the bottom of the CV body. Or the first axial force may be directed upwardly so as to be applied from the bottom of the CV body, in which instance upwardly facing, peripheral regions of the lid are secured to both maintain contact of the lid with the seals and also prevent movement of the CV body as such force (e.g., mechanical or pressure) is applied from beneath the CV body.

This first axial force is applied until the metallic seals are actuated. Actuation may be confirmed via leak testing after the outer O-ring is emplaced. Once the metallic seal is actuated, a second axial force is applied to the center of the lid 30 so as to urge the latch rods in a radial direction to mate with the CV body. This second axial force may be applied after the first axial force is applied, or it may be applied simultaneously while the first axial force is maintained. In the later instance, the first seal is maintained until the rods are actuated in a radial direction.

Once the rods are nested into their receiving apertures formed in the CV body, all forces are removed, and the HICV is deemed sealed after passing the leakage test (per ANSI N14-5 2014) for storage, transport, rolling, or other handling.

To unseal the HLCV, axial forces are reapplied in reverse order.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. A containment structure, the containment structure comprising:

a. a vessel defining a longitudinal axis and an upwardly facing opening defining a periphery, wherein regions of the periphery form apertures;

b. a lid in rotatable and slidable-communication with the periphery wherein the lid moves parallel to the longitudinal axis and orthogonal to the longitudinal axis; and c. a plurality of rods positioned within the lid and adapted to slidably communicate with the apertures, wherein a double hinge is attached to both the periphery and the lid to allow simultaneous rotatable and slidable communication between the periphery and the lid, wherein the double hinge comprises:

d) a first substrate slidably communicating with a second substrate in a direction generally perpendicular to a longitudinal axis of the two substrates, and e) a first region of the first substrate opposing and contacting a second region of the second substrate, wherein both the first and second regions have a concave portion integrally molded with a convex portion.

2. The containment structure as recited in claim 1 further comprising a first annular groove formed in an underside of the lid and adapted to receive a non-metal gasket, and a second annular groove formed in the upwardly facing surface of the periphery and adapted to receive a metal gasket.

3. The containment structure as recited in claim 2 wherein the metal gasket is actuated and de-actuated when subjected to a third axial force of between 20,000 pounds and 60,000 pounds.

4. The containment structure as recited in claim 1 further comprising a center region of the lid, which when contacted with a first axially applied force, imparts radial force to the rods.

5. The containment structure as recited in claim 4 further comprising a center region of the lid, which when contacted with a second axially applied force, imparts medial force to the rods.

6. The containment structure as recited in claim 5 wherein the second axially applied force is manually applied.

7. The containment structure as recited in claim 4 wherein the first axially applied force is manually applied.

8. The containment structure as recited in claim 1 wherein the rods extend radially beyond exterior surfaces of the vessel to engage with adjacent structures.

9. The containment structure as recited in claim 1 wherein a distal end of each of the rods define an enlarged diameter, compared to the diameter of the remaining portion of the rods.

* * * * *